United States Patent
Allen et al.

(10) Patent No.: US 11,226,785 B2
(45) Date of Patent: Jan. 18, 2022

(54) SCALE DETERMINATION SERVICE

(71) Applicants: Vulcan Inc., Seattle, WA (US); Jo Lynn Allen

(72) Inventors: Paul G. Allen, Mercer Island, WA (US); Alan Caplan, Seattle, WA (US); Keith Rosema, Seattle, WA (US); Jeffrey Alex Kramer, Redmond, WA (US); Richard Earl Simpkinson, Issaquah, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/396,549

(22) Filed: Apr. 26, 2019

(65) Prior Publication Data

US 2020/0027427 A1    Jan. 23, 2020

Related U.S. Application Data

(60) Provisional application No. 62/663,995, filed on Apr. 27, 2018.

(51) Int. Cl.
| | |
|---|---|
| *G06F 3/14* | (2006.01) |
| *G09G 5/373* | (2006.01) |
| *G09G 5/38* | (2006.01) |
| *G06F 3/01* | (2006.01) |

(52) U.S. Cl.
CPC ............ *G06F 3/1454* (2013.01); *G06F 3/017* (2013.01); *G09G 5/373* (2013.01); *G09G 5/38* (2013.01); *G09G 2340/045* (2013.01); *G09G 2340/0464* (2013.01); *G09G 2340/0492* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,066,200 B1 | 6/2015 | Loxam et al. | |
| 10,192,115 B1* | 1/2019 | Sheffield | G06T 7/75 |
| 2005/0011959 A1* | 1/2005 | Grosvenor | G06T 7/10 |
| | | | 235/470 |
| 2007/0247518 A1* | 10/2007 | Thomas | G09G 3/002 |
| | | | 348/36 |
| 2012/0230581 A1* | 9/2012 | Miyashita | G06T 19/006 |
| | | | 382/154 |
| 2013/0141419 A1 | 6/2013 | Mount et al. | |
| 2013/0207894 A1* | 8/2013 | Miyashita | G06F 3/0304 |
| | | | 345/158 |
| 2014/0247281 A1* | 9/2014 | Ellenby | G06T 19/006 |
| | | | 345/633 |

(Continued)

OTHER PUBLICATIONS

Third-Party Submission Under 37 CFR 1.290 dated Jul. 21, 2020, U.S. Appl. No. 16/396,556, 34 pages.

*Primary Examiner* — Yingchun He
(74) *Attorney, Agent, or Firm* — Davis Wright Tremaine LLP

(57) ABSTRACT

An augmented reality system obtains sensor data depicting a first object in a scene. The identity of the first object is determined. The system estimates a size of the first object based on the determined identity. Based on the estimated size, the system estimates a scale of other objects depicted in the obtained sensor data. An augmented reality display is generated based at least in part on the size of a second object determined using the estimated scale.

20 Claims, 14 Drawing Sheets

(56) References Cited

U.S. PATENT DOCUMENTS

| | | |
|---|---|---|
| 2014/0285519 A1 | 9/2014 | Uusitalo et al. |
| 2015/0071555 A1 | 3/2015 | D'Antoni et al. |
| 2015/0123966 A1 | 5/2015 | Newman |
| 2016/0022886 A1* | 1/2016 | Bauer ................ G06T 7/62 604/67 |
| 2018/0217429 A1 | 8/2018 | Busch |

* cited by examiner

SCALE DETERMINATION SERVICE

CROSS-REFERENCE TO RELATED APPLICATIONS

This application claims the benefit of U.S. Provisional Patent Application No. 62/663,995, filed Apr. 27, 2018.

BACKGROUND

Augmented reality is a relatively new technology which involves incorporating computer-generated graphics into a view of a user's real physical environment. Typically, augmented reality applications are performed with devices such as smartphones or goggles, which incorporate a camera for capturing an image of the user's physical environment, and a display for presenting the augmented view.

BRIEF DESCRIPTION OF THE DRAWINGS

Various techniques will be described with reference to the drawings, in which.

DETAILED DESCRIPTION

Figure 1:
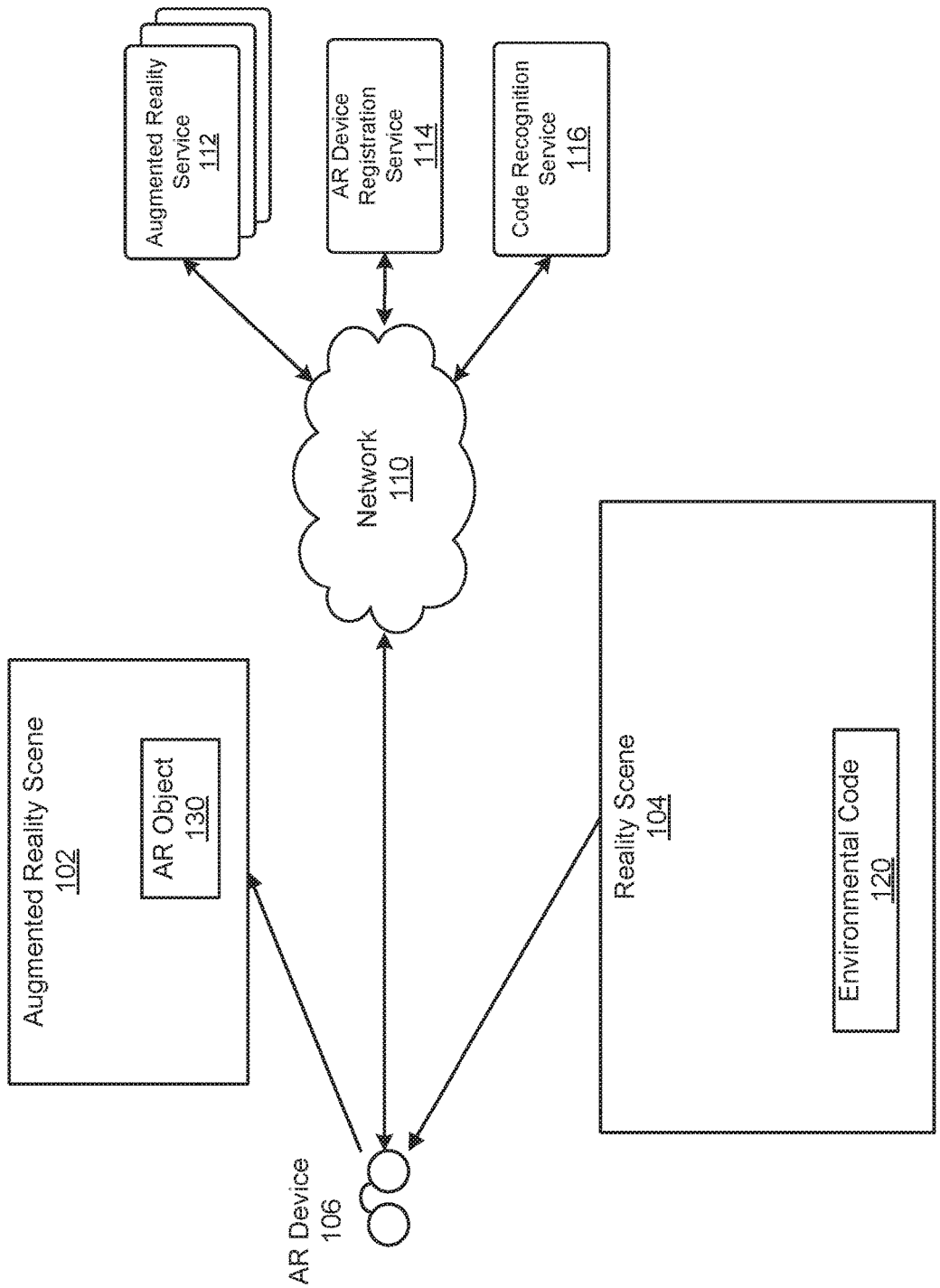
FIG. 1 illustrates an example of an augmented reality system, in accordance with an embodiment.

Techniques and systems described below relate to facilitating participation in augmented reality, or mixed reality, experiences. Disclosed are techniques for enrolling augmented reality devices in an augmented reality experience, techniques for sharing portions of an augmented reality experience with other augmented reality devices, and techniques for determining the scale of objects observed by an augmented reality device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of augmented reality, which may sometimes be referred to as mixed reality, including fields related to enrolling in augmented reality experiences and to sharing augmented reality experiences with other devices. Moreover, techniques described and suggested in the present disclosure are necessarily rooted in technological fields related to augmented reality, to overcome problems specifically arising in the field.

Explanations of the techniques described herein refer to augmented reality ("AR") experiences, or mixed reality experiences. An AR experience comprises a depiction of physical reality combined with computer-generated graphics. Augmented reality, or mixed reality, refers to the generation of visualizations of real-world objects with computer-generated visualizations. These may be enhancements or augmentations of real-world objects, or objects which are wholly computer generated. An AR object, as used herein, may refer to computer-generated visualizations of an object. Examples of such visualizations include depictions of physical objects in which aspects of the depiction are modified. For example, computer-generated graphics might be superimposed or merged into the visual representation of the object. Further examples include the addition of textual information, the magnification of some or all of an object, a halo or other graphic emphasizing the object's location or presence, and so on. These examples are intended to be illustrative, and as such should not be construed in a manner which would limit the scope of the present disclosure to only those embodiments which include the specific examples provided.

In an embodiment of the present disclosure, an environmental code is used as a basis of an enrollment in an augmented reality experience. An environmental code may also be described as an environment code, environmental trigger, augmented-reality code, and so forth. As an example of an embodiment making use of an environmental code, an augmented reality device might observe an environmental code in the environment of the device's user and respond by activating the generation of certain visualizations. An environmental code includes physical objects, printed or displayed patterns, displayed images, and so forth. Alternatively, audio or visual effects may be used, such as a sub-audible audio signal or a light pattern not perceptible to the human eye. However, in some instances, the audio or visual patterns may also be perceptible. For example, a particular song might trigger enrollment, or a particular visual effect. Accordingly, these types of audio or video patterns may also be used as environmental codes.

In an embodiment, an augmented reality device or a hosted system stores associations between an environmental code and information indicating an augmented reality experience. For example, such a stored association might comprise a link to a service that provides services for enhancing an augmented reality experience. This might be done by storing information linking an environmental code to a hyperlink, where the hyperlink points to an internet location providing WebGL-based augmented reality content.

The device or hosted system might also store information defining various properties associated with an enhanced augmented reality experience. In embodiments, such properties may include expiration dates or validity periods for the augmented reality experience, information indicating which devices or users are authorized to enlist in the enhanced experience, and information pertaining to a user's prior interaction with the object. This information might be stored in what may be described as an environment-based cookie. In contrast to conventional, browser-based cookies, environment-based cookies are linked to a combined user identity and environment, and consequently provide a collection of information related to a particular user identity's interaction with an environment, such as a particular building or other location. For example, an environment-based cookie might store information concerning transactions conducted by a particular identity and that particular location.

In an embodiment, environmental codes are recognized automatically. Alternatively, the user may interact with an AR device to request that it detect any observable environmental codes. Then the AR device may ask that the user indicate whether he or she wishes to participate in the AR experience associated with a detected environmental code.

In embodiments, environmental codes are used to facilitate group enrollment in an enhanced AR experience. For example, a plurality of AR devices might detect the availability of an enhanced AR experience, and suggest to the operators of these AR devices that they collectively enroll in the AR experience.

In an embodiment, observation of an environmental code triggers registration of an AR device with an augmented reality experience. The augmented reality experience can, in various embodiments, be wholly or partially cast to or shared with other users. In an embodiment, sharing may be triggered by independent observation of the same environmental code. In another embodiment, sharing is triggered by a gesture or other interaction with an AR device.

Embodiments of the present disclosure may provide support for user gestures to initiate and control sharing of AR objects between AR devices. Further, embodiments may support control over specific objects which may be shared, or over levels or hierarchies of AR objects that are shareable. Users may also control the individuals or groups with which an augmented reality experience is shared. For example, a user may control what AR objects are displayed within his or her own device, which AR objects are shared with friend's devices, with a group's device's, with nearby recipients, or with strangers. AR objects or other aspects of an AR experience may be grouped or arranged into hierarchies, which may be mapped to individuals or groups authorized or not authorized to view shared AR objects.

A user may also choose a level or hierarchy of integration into an AR experience. For example, there might be a low level of AR experience in which only a limited set of environmental codes are recognized and responded to. At a deeper level, a greater number of environmental codes might be recognized and responded to, such that there are a greater number of AR objects displayed to the user at the deeper level than at the higher level.

Embodiments of the present disclosure may support perspective jumping, in which an AR object (which may be an enhanced presentation of a real-world object) is presented to a variety of users from a variety of perspectives. Perspective jumping introduces a variety of technical challenges, related to factors such as the qualities of the AR equipment, placement of objects within each user's field of view, and so forth.

Embodiments of the present disclosure may include or utilize a repository or database of objects. In an embodiment, the repository is accessible to an AR device, or to a service employed by the AR device, via a network such as the Internet. The repository of objects assists in providing various features, including automatic enrollment in an augmented reality experience, determination of the scale of objects in a user's field of view, and enhanced sharing of an augmented reality experience. In an embodiment, objects in the database are associated with links to augmented reality content.

In various embodiments described herein, an augmented reality device obtains information, such as the identity of an object or its size. Obtain such information may comprise the augmented reality device operating in isolation, or in cooperation with another device or server, such as a hosted service. For example, an augmented reality device might perform local processing to determine the identity of an object, or rely at least partly on a remote service. Both instances may be regarded as the augmented reality device obtaining the information.

FIG. 1 illustrates an example of an augmented reality system, in accordance with an embodiment. As illustrated in FIG. 1, the system 100 may include an AR device 106 which views a reality scene 104. A reality scene is used herein to refer to a visual scene as it exists in reality, or in other words as it exists in the real world. A reality scene may be captured visually, i.e., with a camera, or through other techniques including, but not necessarily limited to, imaging based on the infrared spectrum, radio-frequency imaging, acoustic imaging, and so forth.

In an embodiment, the AR device 106 is an augmented reality device such as goggles, headset, tablet computer, smartphone, projector, and so on. In the example of FIG. 1, the AR device 106 comprises a visual display device. The AR device 106 may also comprise two or more visual display devices, e.g., in order to produce stereoscopic imaging effects. Examples of compatible visual display devices include, but are not limited to LED, LCD, and OLED displays. Compatible visual display devices also include projectors, micro-projectors, holographic displays, and so forth. Some embodiments of an AR device 106 may provide augmented reality experiences using non-visual input, such as audio.

In an embodiment, the AR device 106 displays an augmented reality scene 102 onto its visual display(s). As used herein, an augmented reality scene 102 refers to an image combining portions of the scene 104 with one or more additional elements, which may be referred to herein as augmented reality objects. Examples of these include simulated objects, informational displays, and so forth. These may be displayed such that they appear to be an integral part of the scene 104. An augmented reality experience, as used herein, refers to the generation and display of augmented reality objects to the user of an augmented reality device.

In an embodiment, an environmental code 120 is observed, by the AR device 106, in the reality scene 104. An environmental code includes a real-world object that is detectable by the AR device 106. Examples of such objects include, but are not limited, to UPC codes, business cards, and other printed matter, various audio and visual signals, and various features of the physical environment, such as buildings, mountains, bridges, road signs, and so on.

In an embodiment, an environmental code is observed by the AR device 106. The AR device 106 captures an image or other representation of the environmental code 120. In an embodiment, the image or other representation is a bitmap, but any of a variety of representations or processing techniques may be used. The AR device 106 transmits the image or other representation of the environmental code 120 to a code recognition service 116. The transmission may occur over a network 110, such as the Internet.

In an embodiment, the code recognition service 116 identifies the environmental code 120. The code recognition service 116 can include a web-service hosted on an application server, web server, or computing node, for example. In an embodiment, the code recognition service identifies the environmental code and correlates it to an augmented reality service 112.

In an embodiment, an environmental code 120 maps to a particular augmented reality service 112. In another embodiment, an environmental code 120 maps to a class or group of augmented reality services 112.

In an embodiment, the augmented reality services 112 include an activities service, which provides support for identifying an activity being performed in the scene observed by an augmented reality device. The activities service may, either independently or in conjunction with an object recognition service, identify objects or actions related to an activity. For example, if the user of a device is at a basketball stadium, the objects recognized might be the players' uniforms, the fans, the basketball nets, the court, the basketball, and so forth. The combination of these elements might suggest that a particular activity—in this case, a basketball game—is being observed or participated in. In embodiments, the combination of elements is used as an environmental code, and triggers enlistment in an augmented reality experience.

In an embodiment, the system 100 registers the AR device in response to determining that the AR device 106 has observed an environmental code 120 and that the environmental code 120 maps to at least one augmented reality service 112. Registering the AR device 106 comprises obtaining information, such as an IP address, which allows the system 100 to send data for producing the augmented reality scene 102 to the AR device 106. The registration may also comprise obtaining information about the properties and capabilities of the AR device 106, such as screen and camera resolution, frame rate, and so forth. In an embodiment, the information is collected and managed by an AR device registration service. The code recognition service 116, in response to identifying an environmental code from an AR device 106, signals the AR device registration service 114 to complete the registration process by collecting and recording information from the AR device 106.

In an embodiment, the code recognition service 116 notifies the corresponding augmented reality service 112 that the corresponding environmental code 120 has been captured by the AR device 106. The augmented reality service 112 may be provided with information about the AR device. This may include the information collected by the AR device registration service 114.

In an embodiment, the augmented reality service 112 initiates communication with the AR device 106, to enhance the AR experience. This may be done, for example, by the service providing data to the device 106 to produce the desired augmented reality scene 102. For example, an augmented reality service 112 might cause a visualization of the AR object 130 to be displayed by the AR device 106. In an embodiment, the augmented reality service 112 provides bitmaps or other data for the AR object 130, which is then integrated by the AR device 106 into the augmented reality scene 102. In another embodiment, the integration is performed by the augmented reality service 112.

Figure 2:
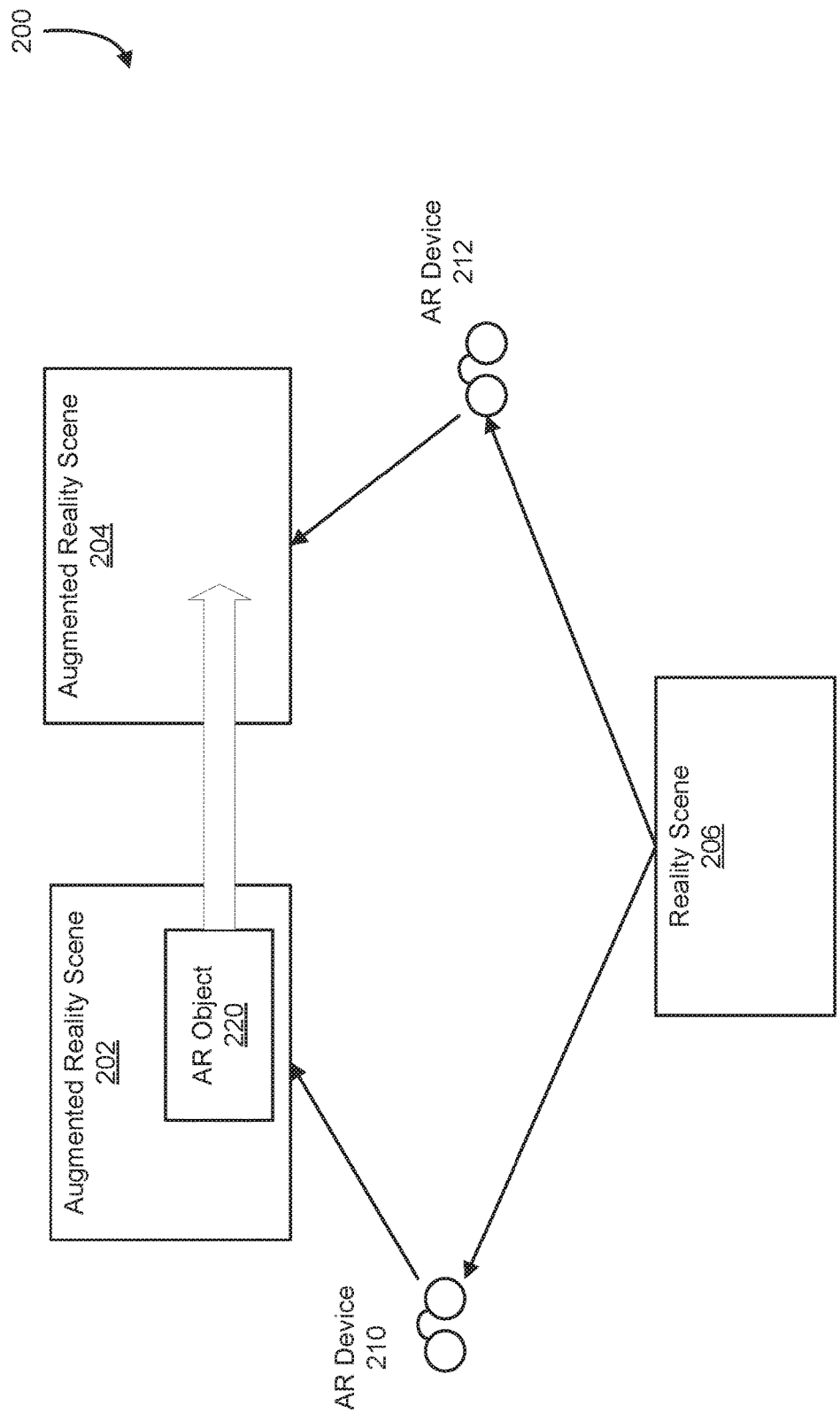
FIG. 2 illustrates an example of sharing an augmented reality object between augmented reality devices, in accordance with an embodiment.

FIG. 2 illustrates an example of sharing an augmented reality object between augmented reality devices. As illustrated in FIG. 2, an example 200 may include a first AR device 210 producing a first augmented reality scene 202 based on a reality scene 206. The example 200 further includes a second AR device 212 producing a second augmented reality scene 204, based on the same reality scene 206. Note, however, that the perspectives of the two AR devices 210, 212 on the reality scene 206 are typically different. This may occur, for example, due to the respective device 210, 212 being placed at different locations.

In the example 200, a visualization of an AR object 220 is displayed by the AR device 210. The display of the visualization may occur, in at least some embodiments, in accordance with the procedure described with reference to FIG. 1.

In the example 200, aspects of AR experience of the first AR device 210 is shared with that of the second AR device 212. This may comprise sharing visualizations of one or more objects. For example, the AR object 220 can be shared with the second AR device 212 by displaying the AR object 220 in both the first augmented reality scene 202 and the second augmented reality scene 204.

Figure 3:
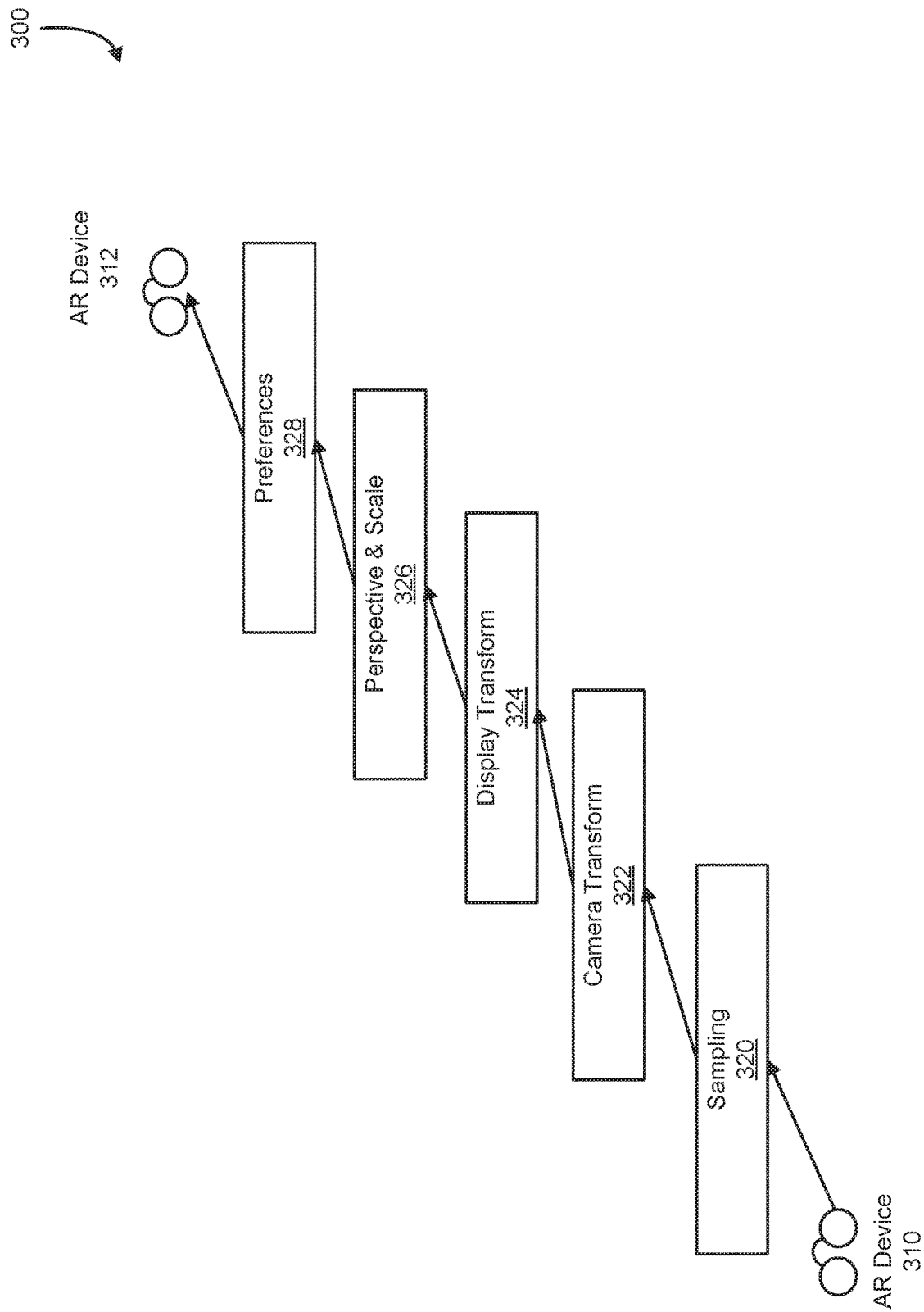
FIG. 3 illustrates an example of adjusting display of a shared AR object, in accordance with an embodiment.

To display the AR object 220 in the second augmented reality scene 204, embodiments may adjust the manner in which the AR object 220 is displayed to adapt to a variety of factors. These factors may include a difference in perspective, the capabilities of the respective devices, the preferences of each user, and so on. FIG. 3 illustrates an example of adjusting display of a shared AR object, in accordance with an embodiment. Techniques depicted by the example 300 of FIG. 3 might, for example, be practiced in conjunction with the sharing of an AR object between devices as illustrated in FIG. 2.

In the example 300 of FIG. 3, a visualization of an object is shared between a first AR device 310 and a second AR device 312. In order to display the visualization of the object on the second device 312, a number of techniques are applied.

In an embodiment, a sampling process 320 controls the operation of a sensor, so as to control or influence the intake of information by the sensor. For example, with respect to a camera, the sampling process 320 might control factors such as framerate, resolution, and so forth.

For example, the visualization of an object might be an enhanced representation of a physical object. Examples include, but are not necessarily limited to, a close-up or magnified view of the object. In an embodiment, the sampling process 320 adjusts the intake of visual information to accommodate for the different magnification levels. This might include adjusting the magnification level employed by a camera in order to synchronize the magnification levels being employed by the AR devices 310, 312. In some instances, each of the AR devices 310, 312 might support different levels of magnification. In such instances, one of the AR devices might increase its magnification level in order to capture data that can be used, by both devices, to display a magnified view of the object. For example, AR device 310 might adjust the magnification levels of its sensors in order to record and send a magnified view of an object to the other AR device 312.

In an embodiment, a camera transform 322 corrects the image of the AR object based on distortions introduced by a camera. Continuing the example of an enhanced display of a real-world object, a camera receiving an image of a real-world object might introduce distortion due to the characteristics of the camera lens, or other similar factors. A transform which corrects for this distortion can be applied to the image. Note that the transform may be applied independently and/or differently on each of the AR devices 310, 312. For example, the distortion introduced by a lens may be different at different magnification levels, and a different transform might be applied for some magnification levels. Likewise, in some circumstances there might be no need to apply a transform at some magnifications, but necessary at other levels of magnification.

In an embodiment, a display transform 324 is applied to the AR object. The display transform 324 is based on characteristics of the display of the second AR device 312. These characteristics can include display geometry, pixel density, color space, and so forth. For example, a given model of AR device may have a specific geometry which, if unaccounted for, could cause an AR object displayed on the first AR device 310 to appear substantially different than the same AR object displayed on the second AR device 310.

In an embodiment, a perspective and scale transformation 326 is applied to the AR object. This step can include a number of different adaptations related to the size, orientation, and position of the AR object. These qualities may be substantially different on each of the AR devices 310, 312. For example, consider a virtual scoreboard displayed as if it were a real object in an augmented reality scene. It might be desired to ensure that the scoreboard is always easily visible, regardless of the position of the viewer. Consequently, the size, position, and orientation of the virtual scoreboard may be independently adjusted on each of the AR devices 310, 312, so that the virtual scoreboard is visible and usable to each corresponding user. For example, the scoreboard might be enlarged for a user who is farther away from the position of the virtual scoreboard in the augmented reality scene, or the scoreboard might be positioned more closely to the user on one device than on another.

In an embodiment, preferences 328 are applied. These might include adopting preferences for font size, AR object positioning, and so forth. Continuing the scoreboard example, in cases and embodiments the font size used in the scoreboard might be enlarged, while perhaps keeping the position and size of the scoreboard the same.

In various embodiments, the techniques depicted by the example 300 comprises an exchange of information between the respective AR devices 310, 312. The exchanged information may include information describing a requested sampling level, camera and display transforms, perspective information, and scale information. The respective device may adjust its display of a visualization of an object based on this information. The adjustments may include processing transform data to adapt sensor data to local display, enabling rotation of an object based on sensor data acquired by the other AR device, enlarging or shrinking visual data provided by the other AR device in order to account for scale differences, and so forth.

Figure 4:
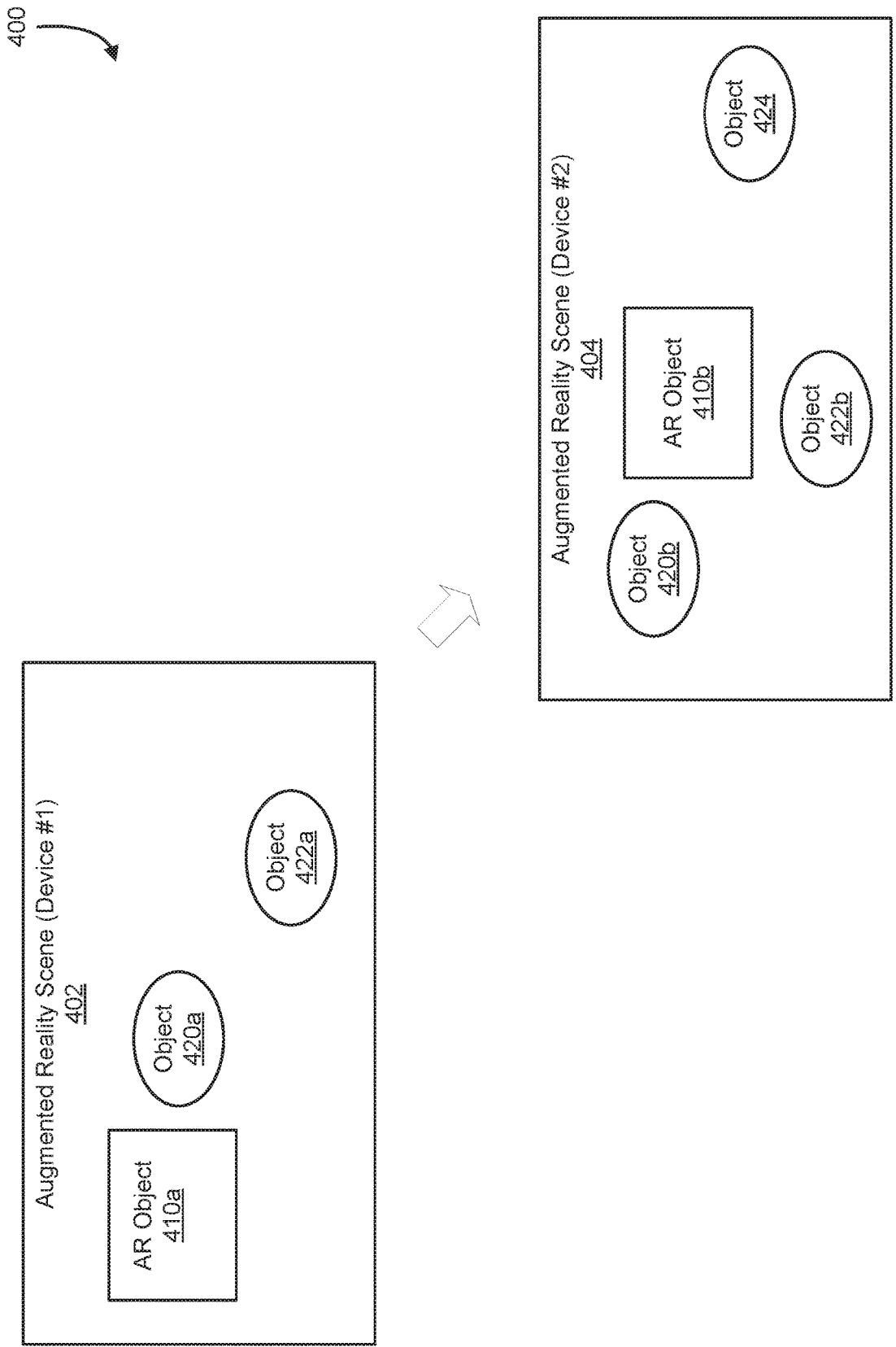
FIG. 4 illustrates an example of adjusting display position of a shared AR object, in accordance with an embodiment.

Another factor that may be accounted for, in various embodiments, is differences in the positioning of objects within each user's field of view. FIG. 4 illustrates an example of adjusting the display position of a shared visualization of an object, in accordance with an embodiment. In particular, FIG. 4 illustrates an example 400 an example of sharing an AR object 410 between two AR devices, so that the shared visualization of the AR object 410 appears in the augmented reality scenes 402, 404 of both devices. As illustrated in FIG. 4, the visualization of the AR object 410*a* may be displayed differently in the first device's augmented reality scene 402, as compared to the visualization of the AR object 410*b* as it is displayed in the second device's augmented reality scene 404. FIG. 3 illustrates some reasons for these differences. Another reason involves the placement of objects within each augmented reality scene. As illustrated by FIG. 4, the first device's augmented reality scene 402 may include objects 420*a* and 422*a*. These objects may also be included in the second device's augmented reality scene 404, but in different locations. This could occur, for example, when the objects 420, 422 are real-world objects being viewed by the two AR devices from different perspectives. There might also be an additional object 424 included in the second device's augmented reality scene 404 that is not included in the first device's scene. This object 424 might correspond to a real-world object not in the first device's field of view, or it might be a generated object that is only being displayed by the second device.

In an embodiment, the placement of the AR object 410 is moved to account for the different placement of the objects. In an embodiment, the AR object 410*b* is placed by identifying objects 420*b*, 422*b* 424 within the field of view, and placing the AR object so that it avoids obscuring any of the objects. In a further embodiment, correspondence between the objects 420*a*, 422*a* in the first device's augmented reality scene 402 and the objects 420*b*, 422*b* in the second device's scene 404 is determined. In this example embodiment, the AR object 410*b* is placed so as to maintain an association with the object 410. The AR object 410 might, for example, be related to the object 420*a*. In an embodiment, visual indication of this relationship is maintained in the two scenes based on a determined correspondence between the objects 420*a*, 420*b* in the two scenes 402, 404.

Figure 5:
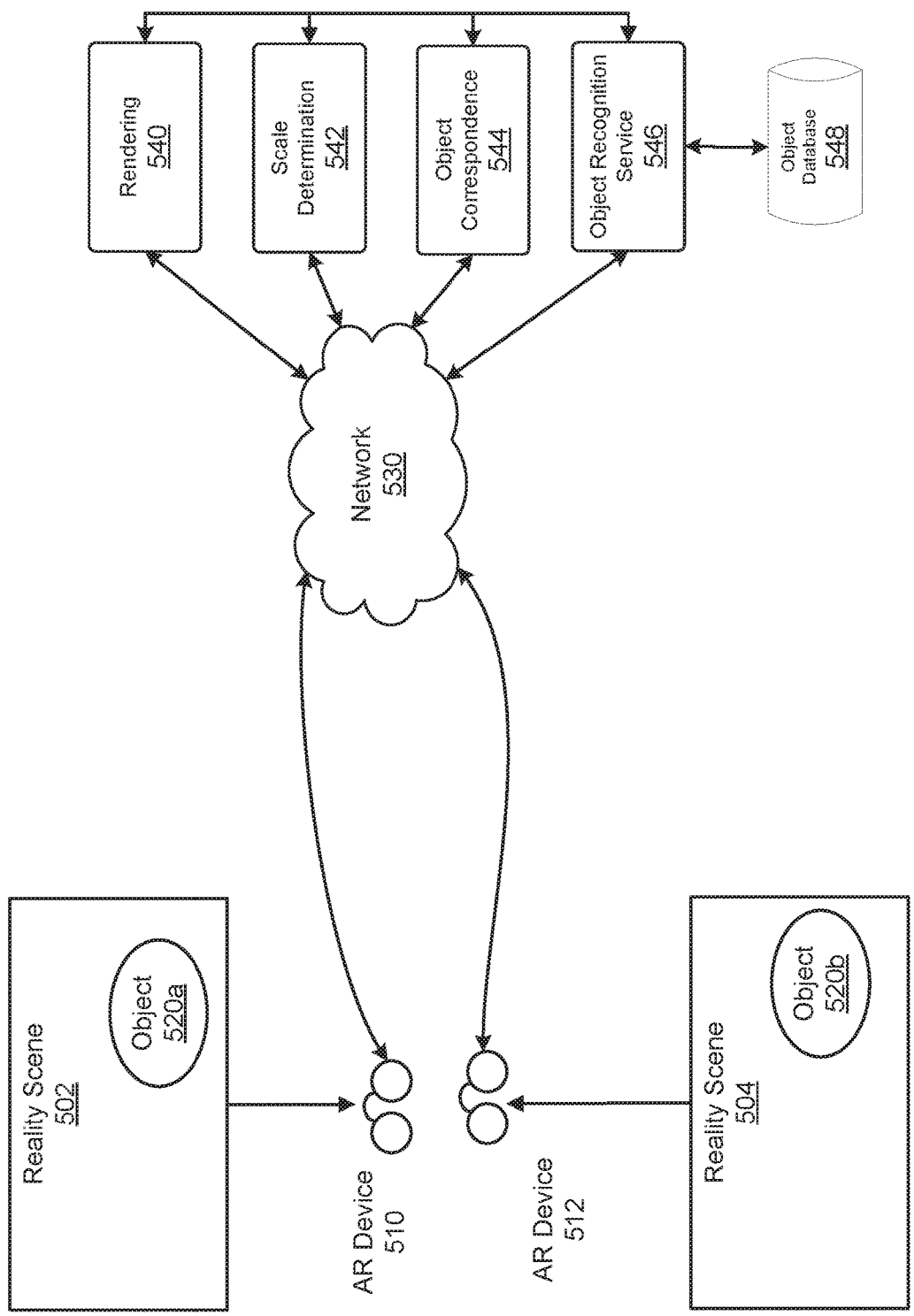
FIG. 5 illustrates an example of an augmented reality system, in accordance with an embodiment.

FIG. 5 illustrates an example of an augmented reality system, in accordance with an embodiment. In the example 500 of FIG. 5, two AR device's 510, 512 are viewing a physical environment from two similar but not identical perspectives. Each of the illustrated reality scenes 502, 504 corresponds to a view of the physical environment from the perspective of the corresponding device 510, 512. It may be assumed, for illustrative purposes, that the same physical object 520 is represented in each scene 502, 504, but this is not known initially.

In an embodiment, image data for the object 520*a* may be sent by the AR device 510 to one or more services 540-546. Here, a service refers to a remotely located computing service, such as a web service that is accessible to the AR devices 510, 512 via a network 530, such as the internet. The services are hosted on application servers, a web server, or similar device.

In an embodiment, the image data comprises a bitmap or other representation of the scene 502 or the object 520*a*. In an embodiment, the data is sent to an object recognition service 546. In an embodiment, the object recognition service 546 consults an object database 548 to identify the object 520. A number of further services may then be applied, based on the recognized object 520.

In an embodiment, a scale determination service 542 uses known properties and dimensions of the identified object 520 to make determinations regarding the scale of other objects that might be visible to the AR device 510.

In an embodiment, an object correspondence service 544 assists in the mapping of an object 520*a* visible to a first AR device's 510 to an object 520*b* (the same physical object) also visible to the second AR device 512. Each device 510, 512 may, for example, utilize the object recognition service 546 to identify objects within their respective fields of view, and then utilize the object correspondence service 544 to determine which objects in the first device's 510 view correspond to objects in the second device's 512 view.

In an embodiment, a scale determination service 542 assists in the determination of the scale of other objects and features in the scenes 502, 504 of the AR devices 510, 512. For example, in an embodiment, information about the size of an observed and identified object 520 is retrieved from the object database 548. This information may be used to determine the scale of other objects and features within the scenes 502, 504.

In an embodiment, a rendering service 540 assists in the rendering of the augmented reality scenes displayed by the AR devices 510, 512. In an embodiment, the rendering service comprises a graphics pipeline which renders AR objects and/or merges AR objects into a scene for display on one or more of the AR devices 510, 512.

In an embodiment, the object database 548 comprises records and data usable to identify objects which may appear in the view of an AR device 510. Examples of such objects include, but are not limited to, pens, pencils, business cards, footballs, soccer balls, baseballs, playing field, car windshield, road signs, and so forth. It will be appreciated that these examples are intended to be illustrative, and should not be construed so as to limit the scope of the present disclosure.

In an embodiment, the object database 548 comprises representations of objects in formats suitable for searching. In an embodiment, the database is indexed based on representations or attributes provided by an AR device 510, 512. For example, a bitmap or other representation of an object 520 might be used to search the database.

In an embodiment, the object database 548 comprises data for objects, such as typical or representative sizes and dimensions, typical or representative colors, and so forth. In an embodiment, the object database 548 comprises data representative of typical behaviors for an object. For example, the database might indicate whether an object such as a baseball is typically captured while in motion. The database might also contain information indicating a context in which the object is likely to be observed.

In an embodiment, the object database 548 comprises an identifier for each object. In an embodiment, the identifier is indicative of the object's place in a hierarchy of objects. In an embodiment, the identifier uniquely identifies the object.

In an embodiment, the object database 548 comprises data linking the object to other services, such as the augmented reality services 112 depicted in FIG. 1. In an embodiment, the object database 548 comprises information identifying certain objects as environmental codes, and comprises information linking environmental codes to other services or to providers of enhanced augmented reality experiences.

Figure 6:
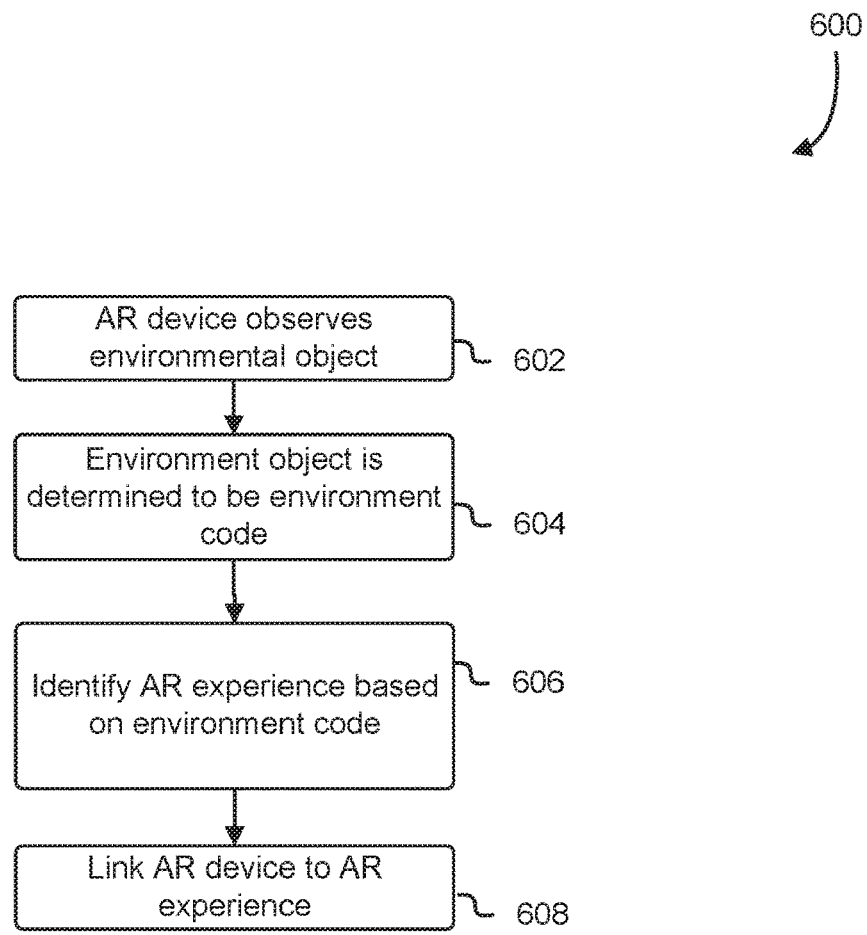
FIG. 6 is a flow diagram illustrating an example of a process for enrolling an AR device into an augmented reality experience, in accordance with an embodiment.

FIG. 6 is a flow diagram illustrating an example of a process 600 for enrolling an AR device into an augmented reality experience, in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 14:
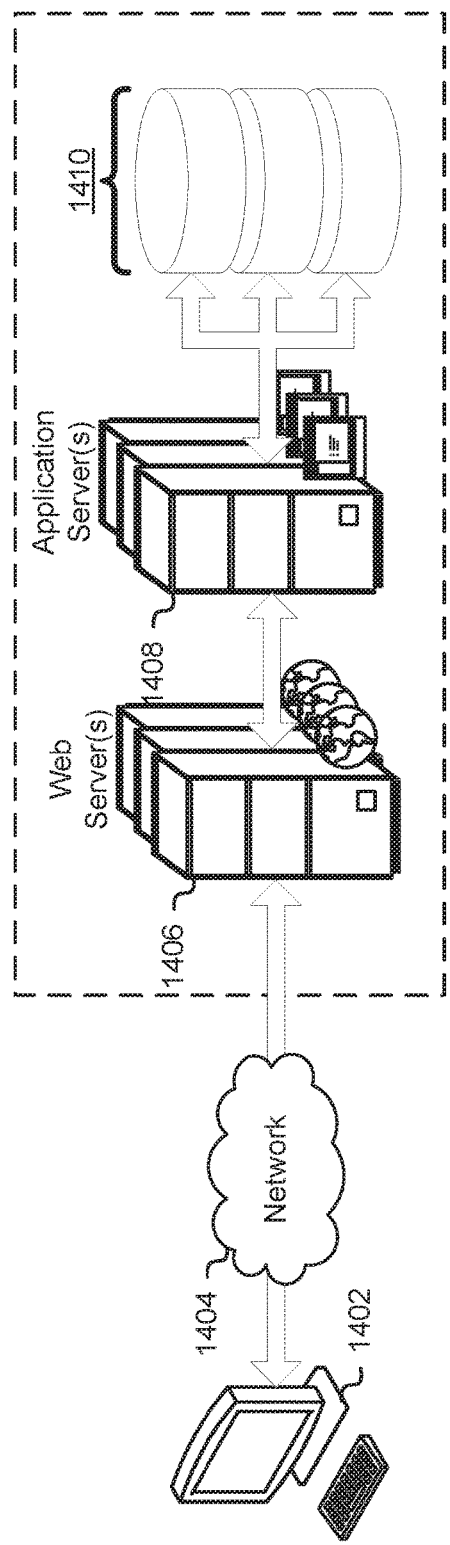
FIG. 14 illustrates an environment in which various embodiments can be implemented.

For example, some or all of process 600 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 600 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel.

The process 600 includes a series of operations wherein an AR device observes an object in the physical environment and, based on the observed object, enables an augmented reality experience in the device.

In 602, the AR device observes an object in the environment and captures a representation of the object.

In 604, it is determined that the observed object is an environmental code, such as the environmental code 120 depicted in FIG. 1. In an embodiment, this is done by the AR device. In another embodiment, information about observed objects, or a complete scene, is transmitted to a code recognition service, and the service determines which, if any, of the observed objects are environmental codes.

In 606, an AR experience is identified based on the environmental code. This may comprise searching an object database, such as the object database 548 depicted in FIG. 5, for an entry that matches or otherwise corresponds to an observed object. In an embodiment, the record located in the database include a link to an augmented reality service capable of providing an AR experience associated with the object. In another embodiment, the AR experience is not associated with the object, except that the AR experience is triggered by the object. For example, in some instances information about the environmental code might be displayed as part of the AR experience, while in other instances the environmental code is simply used to initiate communication between the AR device and an augmented reality service.

In 608, the AR device is linked to the AR experience. During 602-606, an environmental code was submitted by an AR device, recognized, and a corresponding augmented reality service identified. In an embodiment, the AR device is notified of and then registers with the augmented reality service. In another embodiment, the augmented reality service is notified of that the AR device should be enrolled, and is provided with relevant information such as the IP address of the AR device.

Figure 7:
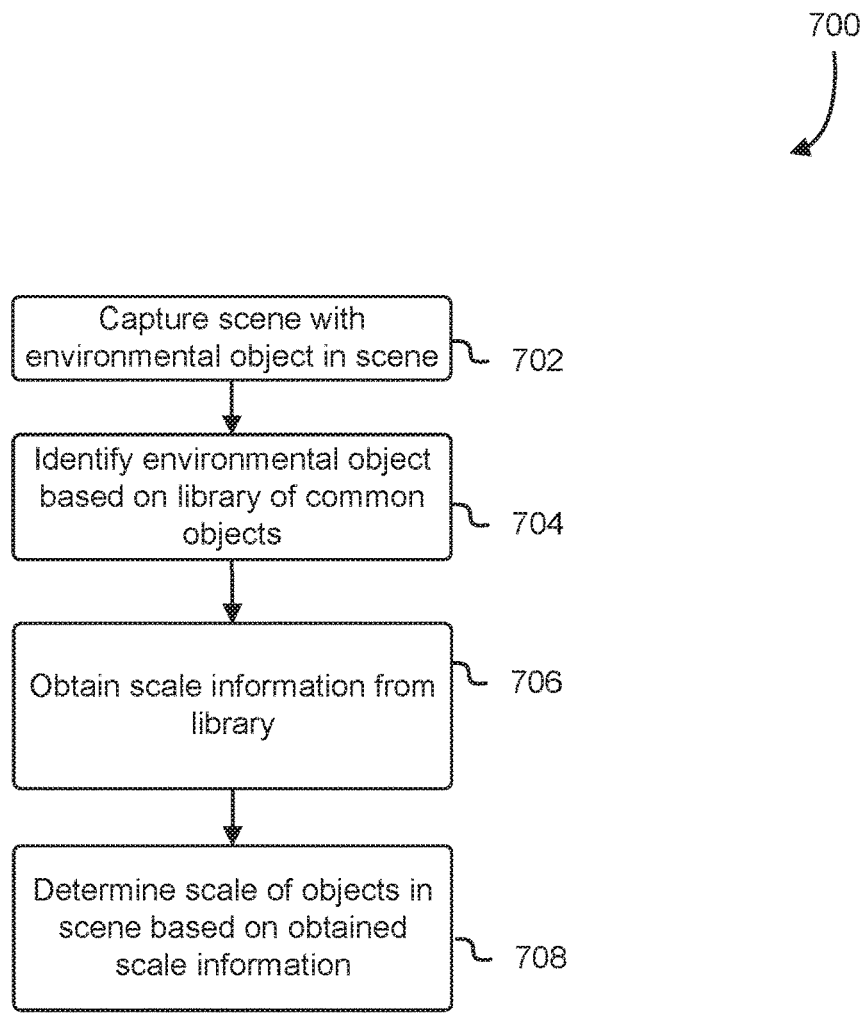
FIG. 7 is a flow diagram illustrating an example of a process for identifying the scale of objects observed by an AR device, in accordance with an embodiment.

FIG. 7 is a flow diagram illustrating an example of a process 700 for identifying the scale of objects observed by an AR device, in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 700 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel. The process 700 includes a series of operations wherein the scale of objects viewed by an AR device is determined.

In 702, an AR device captures a scene with at least one environmental object. Here, environmental object refers to a physical object within the field of view of the AR device.

In 704, an object recognition service identifies the environmental object, based on a library of common objects. The library may correspond, for example, to the object database 548 that FIG. 5 depicts.

In 706, information about the scale of the observed object is obtained from the library of common objects. The scale information may include typical or representative dimensions for the objects stored in the database. The information may include statistical information regarding typical size ranges. The size information may account for the three-dimensional nature of physical objects, and for the potential orientations of the objects with respect to the AR device.

In 708, information about the scale of other objects in the scene is derived from the scale information for the identified object.

Figure 8:
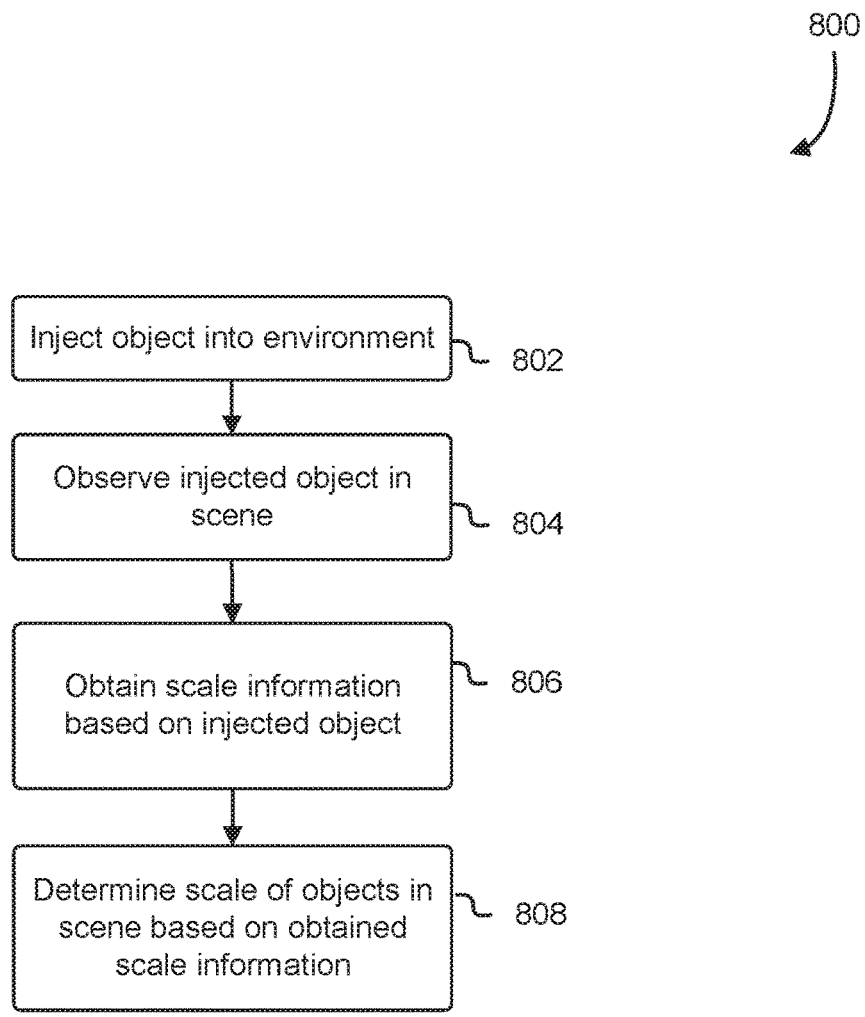
FIG. 8 is a flow diagram illustrating an example of a process for identifying the scale of objects observed by an AR device, in accordance with an embodiment.

FIG. 8 is a flow diagram illustrating an example of a process for identifying the scale of objects observed by an AR device, in accordance with an embodiment. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 800 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel. The process 800 includes a series of operations wherein the scale of objects viewed by an AR device is determined, based on an object injected into the observed environment.

In 802, an object is injected into the environment. Here, injected refers to one of a variety of approaches that may be employed to place an environmental code into an environment viewable by an AR device. An object can be placed in an environment, e.g., by the user of an AR device placing a business card, keys, or a token within the view of the AR device, or by a shopkeeper physically placing an object in an environment. An object might also be digitally created in an environment. This might be done, for example, by causing a pattern to be displayed on a display screen located within the viewable environment, projecting a pattern onto a wall or game board, and so forth.

In 804, the injected object is observed in the scene, and then in 806 scale information is obtained based on the observed injected object. In an embodiment, this comprises identifying the object and then, once the identity of the object has been determined, deriving information about the scale of the injected object. Based on this information, the scale of other objects in view may then be estimated, in 808.

Figure 9:
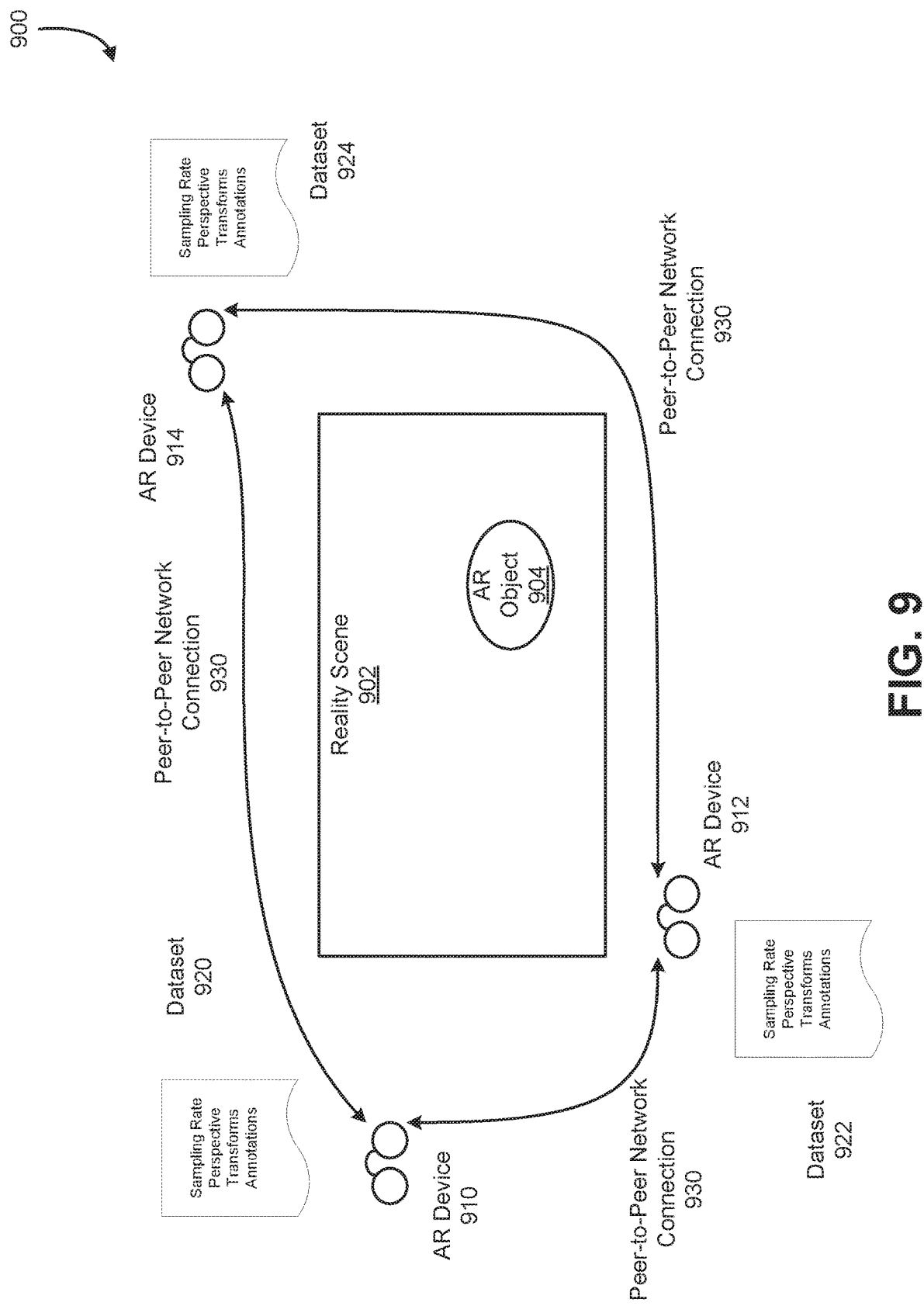
FIG. 9 illustrates an example of peer-to-peer exchange of transform information, in accordance with an embodiment.

FIG. 9 illustrates an example of peer-to-peer exchange of transform information, in accordance with an embodiment. In the example 900, three AR devices 910-914 are observing a reality scene 902 from different perspectives. Each of the AR devices 910-914 is also viewing an AR object 904. The AR object 904 might, for example, correspond to an enhanced presentation of a real-world object visible in the reality scene 902.

In an embodiment, each of the AR devices 910-914 is connected by a peer-to-peer network connection 930. Alternatively, each of the AR devices 910-914 is in communication via another network type, such as wireless connections to the Internet.

In an embodiment, each of the AR devices 910-914 generates and shares a dataset 920-924. In an embodiment, the dataset 920-924 comprises information usable by other AR devices 910-914 to display the AR object 904, or to adjust a device's operation to enhance display of the AR object 904 by other devices.

In an embodiment, the datasets 920-924 comprise sampling rate information. In an embodiment, the information includes a desired sampling rate, or other information pertaining to how the AR devices 910-914 should collect visual data. For example, the devices might share desired lighting levels, desired image resolutions, and so forth. This may help the devices 910-914 adapt to different conditions, such as differences in perspective, zoom level, and so forth.

In an embodiment, the datasets 920-924 comprise perspective information. For example, in an embodiment, each device 910-914 shares information about the perspective it is viewing an object from.

In an embodiment, the datasets 920-924 comprise information about transforms. This may include camera transforms, enabling other AR devices 910-914 to correct for image abnormalities introduced by another device's camera. The devices may also share transforms applicable to each devices display. In another embodiment, transforms are provided to enable manipulation or correction of visual data provided by one of the devices 910-914.

In an embodiment, the datasets 920-924 comprise annotations, comments, and other similar data. In an embodiment, voice or gesture input by a user is recorded by one of the devices 910-914 and shared with the other devices. These may be useful to identify key points of interest. For example, a first users might perform a gaze gesture to indicate a particular area of interest on the AR object 904. This point of interest can then be shared with other AR devices 910-914.

Figure 10:
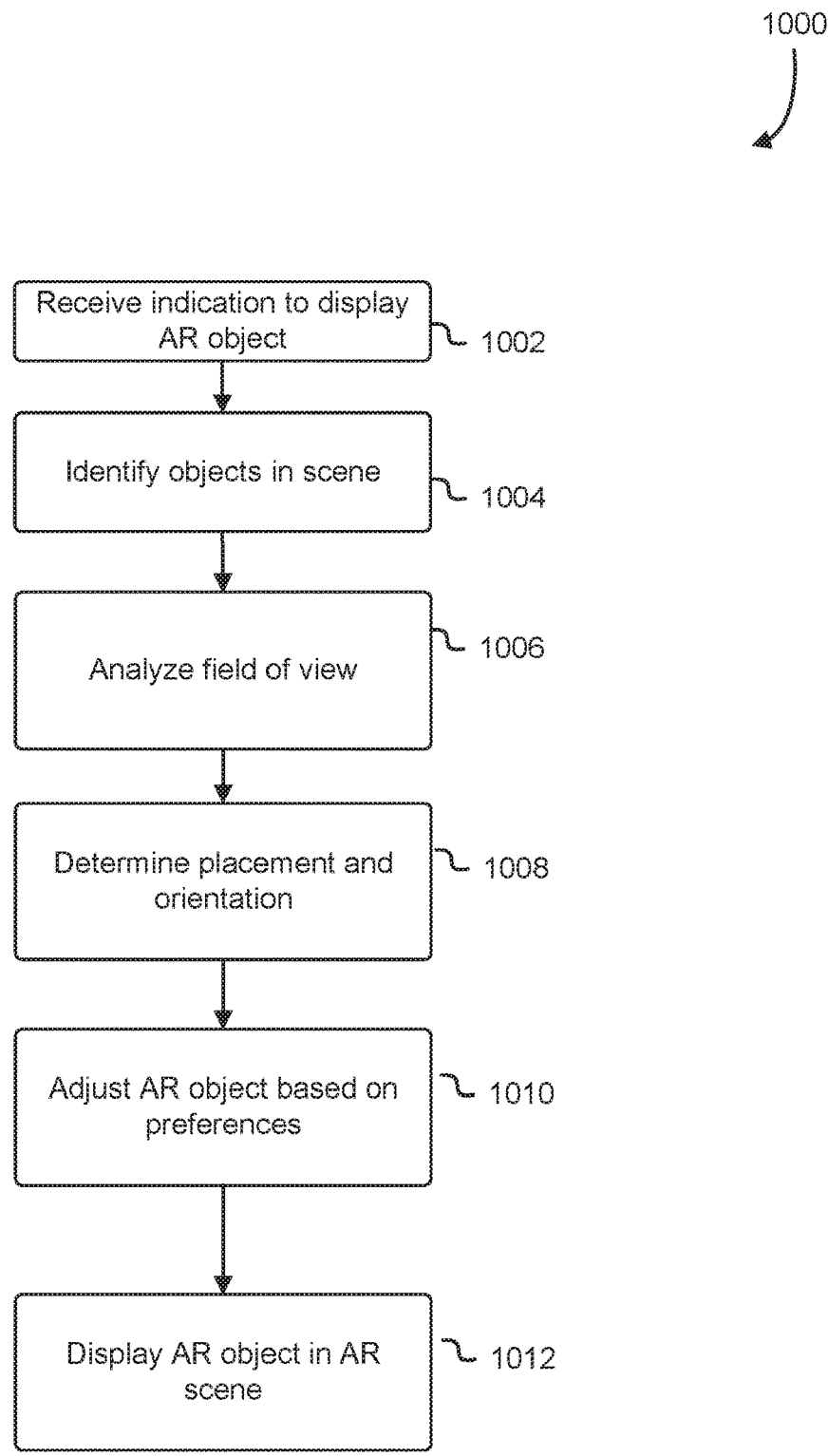
FIG. 10 is a flow diagram illustrating an example of a process for displaying an AR object in an augmented reality scene, in accordance with an embodiment.

FIG. 10 is a flow diagram illustrating an example of a process for displaying an AR object in an augmented reality scene, in accordance with an embodiment. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 1000 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel. The process 1000 includes a series of operations wherein an AR object is placed and displayed within an augmented reality scene.

In 1002, an indication to display an AR object is received. In an embodiment, this involves receiving a notification or other indication that a particular AR device should display an AR object. This may occur, for example, as a consequence of observing an environmental code, as described by FIG. 6.

In 1004, objects within the scene are identified. This may comprise application of various image processing techniques, and may also involve searching an object database, such as the object database depicted in FIG. 5. One output of this stage is the placement of objects within the field of view, and an estimate of the importance of those objects. For example, a person in the foreground of the image might be ranked as highly important, while a geographic feature on the horizon might be ranked as not important.

In 1006, the field of view is analyzed. This may comprise determining object placement, as just described. It may also comprise analyze of other aspects, such as comparing the placement of objects relative to the display properties of the AR device. It may also comprise determining whether those display properties would help or hinder display of the AR object. For example, in some cases it may be undesirable to display an AR object outside of the user's field of central vision.

In 1008, the placement and orientation of the AR object is determined. This may, as just explained, be based in part on an analysis of the field of view, and an analysis of objects within the field of view. It may also be based on other factors, such as aspects of the object identified as interesting by another user (in which case, for example, the AR object might be re-oriented to show the interesting point). Embodiments may also move the AR object within the scene to avoid occluding objects estimated to be important.

In 1010, the AR object is further adjusted based on user preferences. For example, the user might prefer larger font sizes, wish to avoid the user of certain colors or brightness levels, and so forth.

In 1012, the AR object is displayed in the augmented reality scene, in accordance with the determinations made in the aforementioned steps. Embodiments may generally attempt to place the AR object so that its view is synchronized, in at least some fashion, with other devices sharing the visualization. Here, synchronization refers to commonality between the respective displays, such that information deemed important or relevant is displayed on each device that shares the visualization. For example, a first user might perceive an important feature on the side of an object that is only visible to that user, due (for example) to differences in perspective between the two users. Synchronization of the display would then involve including a depiction of this feature on each other device. Synchronization may therefore be described as including features observed by a first augmented reality devices on a second augmented reality device, even when the feature would not normally be perceptible to the second augmented reality device.

Figure 11:
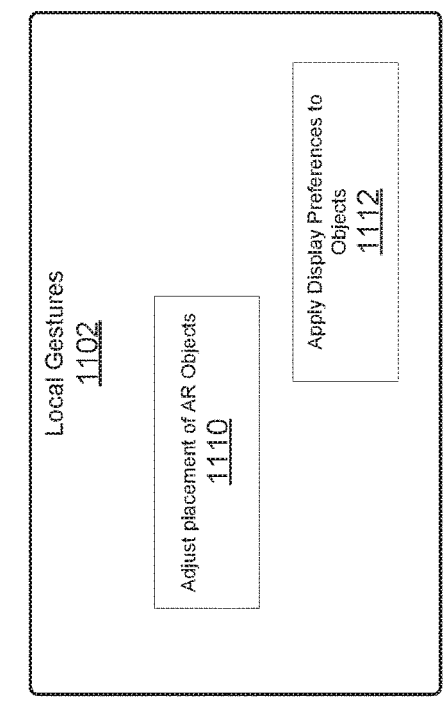
FIG. 11 illustrates an example of gesture control for sharing AR objects, in accordance with an embodiment.
Figure 11:
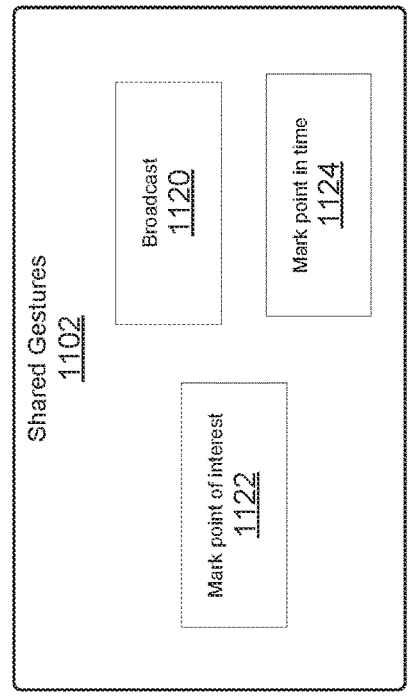

FIG. 11 illustrates an example of gesture control for sharing AR objects. The example 1100 depicts classifications of gestures used to control sharing of AR objects between AR devices. A first classification is local gestures 1102, which refers to gestures used to control an individual's AR experience, typically without influencing the AR experience of other's sharing one or more AR objects. An example of a local gesture 1102 is adjusting the placement of AR objects 1110 within an augmented reality scene. A user might wish to move an AR object, and perform a hand or eye gesture to effect the movement, but not wish for the same effect to be propagated to another user. Likewise, a similar example involves the application of preferences. A user with poor eyesight might wish to use large font sizes to display AR objects, but might not wish for other users to be forced to adopt that preference. Gestures for applying display preferences 1112, when they apply to the user's preferences but not those of others, may therefore be classified as local gestures 1102.

A second classification is shared gestures 1102, which refers to gestures to control display of an AR object on another user's AR device, or to otherwise enhance the experience of sharing an AR object between augmented reality devices.

A first example of a shared gesture 1102 is a broadcast gesture 1120. For example, a gaze gesture combined with a hand movement might collectively be treated as a broadcast gesture. By performing the broadcast gesture, a user might indicate that a particular AR object should be shared with other users. Similarly, a "flick" gesture might be employed to share the visualization of an AR object with other users, or with a particular user.

A second example is a gesture to mark a point of interest 1122. For example, a gaze gesture might indicate a particular area of interest on an AR object. This gesture, when performed, might for example cause the area of interest to be highlighted in the other user's augmented reality displays.

Another example of a shared gesture is a gesture to mark a point in time 1124. For example, a first user might state the gesture-word "mark," and the current point in time might be recorded. In an embodiment, this information is shared with other users, and can be used for various purposes. For example, in an embodiment, the other users can "rewind" the AR object, or the entire scene, to the marked point in time.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 12:
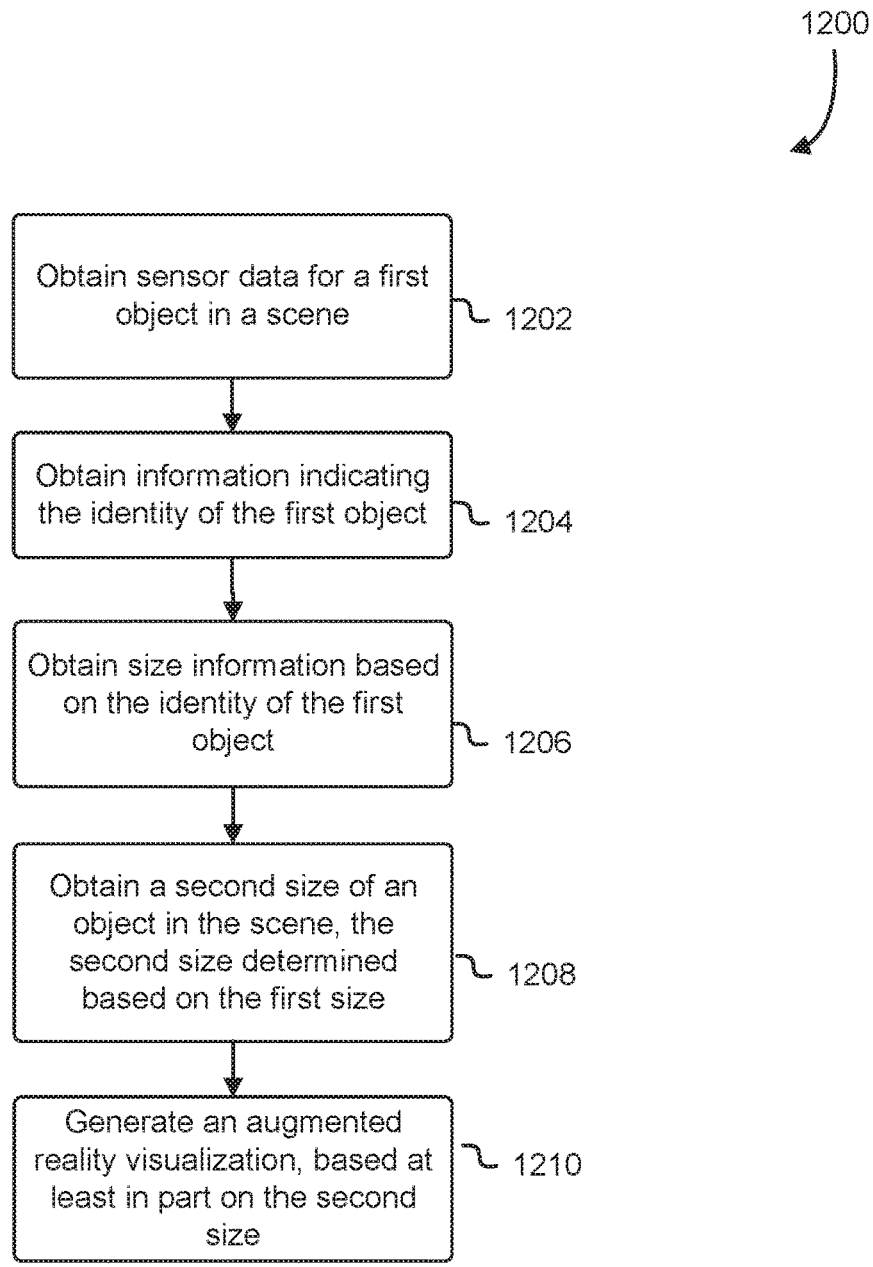
FIG. 12 illustrates an example process of determining scale information, in accordance with an embodiment.

Various aspects of the present disclosure may be further understood in view of FIG. 12, which illustrates an example process of determining scale information, in accordance with an embodiment. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1200 may be performed by any suitable system, or combination of systems, such as an augmented reality device operating in conjunction with a server in a data center. In some embodiments, some or all of the process 1200 may be performed by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 800 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel. The process 800 includes a series of operations wherein the scale of objects viewed by an AR device is determined, based on an object in the observed environment.

In various embodiments, some or all operations described below are performed by a one or more services executing on a server, such as the servers depicted in FIG. 14. The services may, for example, act on behalf of or as an agent of an augmented reality device. Accordingly, although certain of the following operations are described as being performed by an augmented reality device, they may in various embodiments be performed, in whole or in part, by a service acting on behalf of the augmented reality device.

At 1202, an augmented reality device obtains sensor data for a first object in a scene. For example, as described with respect to FIGS. 7 and 8, embodiments may capture sensor data, such as data from a camera or infrared sensor, which represents the various objects that may be observed in an environment.

At 1204, the augmented reality device obtains information indicating the identity of the first object. Here, identity includes classification of an object, such as determining in general terms what category or categories the first object belongs to. Generally speaking, more precise classifications will lead to better accuracy. For example, an object recognition service, such as the object recognition service 546 depicted in FIG. 5, might categorize an observed object as belonging to the categories "ball" and "basketball." The latter categorization allows for more precise determinations of the size of an object. In embodiments, identity is also determined more precisely. For example, an environmental code might be imprinted on an object whose size is known exactly, and stored in association with the code. In an embodiment, the device recognized an environmental code in the sensor data, and obtains, based on the environmental code, the identity of the object. The size of the identified object is then retrieved from a database, and the size and scale of other objects in the scene may then be determined.

At 1206, the augmented reality device obtains size information based on the identity of the first object. As just explained, this may be determined as an estimate, based on the general identity, or classification, of the object. Statistical approaches may be employed. For example, the size of a soccer ball or basketball might be known generally, but may nevertheless vary due to factors such as manufacturer, inflation levels, and so on. The size information may therefore be based on statistics of objects sharing the same general identity.

In embodiments, the size is determined with greater precision when the particular identity of the object and its size are known. For example, the size of certain landmarks may be known precisely. Examples include a football field for a major sports team, a well-known building, and so forth. Another example uses an environmental code known to be imprinted on an object of a certain size.

At 1208, the augmented reality device obtains a second size of an object in the scene, determined based on the first size. As noted above, the scene as observed by the augmented reality device contains the first object, whose size base been determined, and a second object, whose size is not known. However, the size may be determined based on the first size. As noted above with respect to FIGS. 7 and 8, the estimate of the size of the first object allows the scale of the observed scene to be determined. For example, knowing the size of an observed object allows the system to distinguish between objects that are large versus objects that are merely close-up in the device's field of view. Accordingly, the augmented reality device uses the estimate of the first object's size to determine the scale of other objects depicted in the scene.

Embodiments may use the size and scale determinations to perform other functions, such as determining the distance from the device to the second object. For example, the augmented reality device may obtain an estimate of the distance to the second object, based on scale information derived from the first size.

At 1210, the augmented reality device generates an augmented reality visualization based at least in part on the second size. For example, the device may generate a visualization of the second object. For example, the size information may be used to improve object classification and identification, or to improve tracking of the second object as it moves about the scene. For example, the identity of the second object may be determined based at least in part on the scale information. This might help, for example, to distinguish between a replica of a landmark viewed from close-up, and the real landmark viewed from afar. These and other data points may be derived based at least in part on the estimated size of the object, and used to improve an augmented reality visualization.

Another example is that the size or scale information may be used to determine how important an observed object is. A mountain in the background of a scene might be large, but not important, whereas a smaller object in the foreground may be important. Knowledge of scale allows for such determinations to be made with greater accuracy. This may also aid in the generation of an augmented reality visualization.

Figure 13:
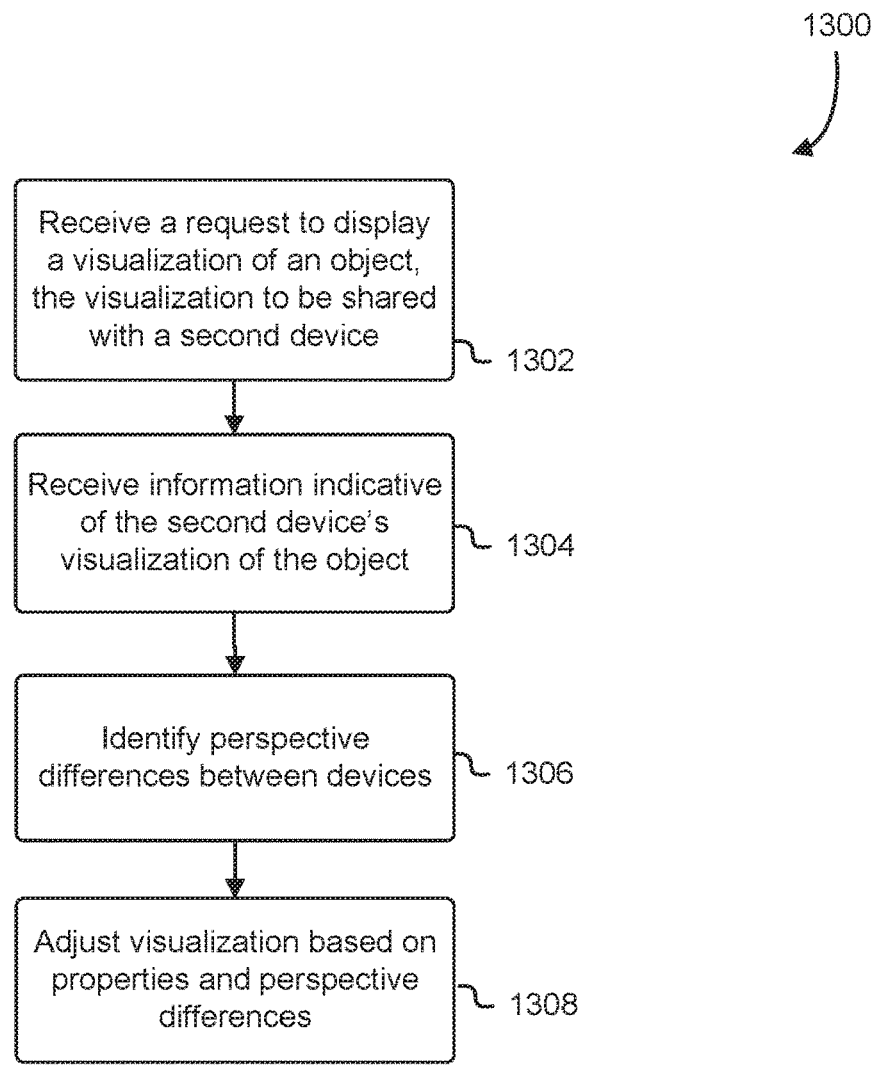
FIG. 13 illustrates an example process of sharing a visualization in augmented reality, in accordance with an embodiment.

Various aspects of the present disclosure may be further understood in view of FIG. 13, which illustrates an example process of sharing a visualization in augmented reality, in accordance with an embodiment. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1300 may be performed by any suitable system, or combination of systems, such as an augmented reality device operating in conjunction with a server in a data center. In some embodiments, some or all of the process 1300 may be performed by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402. Alternatively, at least some or all of the process 800 may be performed by an AR device with one or more processors suitable for executing the instructions, or comprising specialized hardware devices for performing aspects of the depicted operations. In various embodiments, except where logically required (for example, when the input to a subsequent operation requires the output of a previous operation), the depicted operations may be performed in an order other than the depicted order, or in parallel. The process 800 includes a series of operations wherein the scale of objects viewed by an AR device is determined, based on an object injected into the observed environment.

In various embodiments, some or all operations described below are performed by a one or more services executing on a server, such as the servers depicted in FIG. 14. The services may, for example, act on behalf of or as an agent of an augmented reality device. Accordingly, although certain of the following operations are described as being performed by an augmented reality device, they may in various embodiments be performed, in whole or in part, by a service acting on behalf of the augmented reality device.

At 1302, an augmented reality device receives a request to display a shared visualization of an object. The visualization is to be shared with at least a second augmented reality device. Sharing a visualization refers to providing a common or synchronized view of the object between the participating devices. For example, each participating device might display the same zoom level, view the object from the same angle, highlight the same region of the object, and so forth.

As depicted in FIGS. 2-4, and as discussed in further detail regarding the process 1300, sharing a visualization may comprise adjustments to the local display of a visualization based on properties of the visualization provided by another device, and based on adjustments to allow for perspective differences between the devices.

At 1304, the augmented reality device receives property information pertaining to the second device's visualization of the object. As described herein, for example with respect to FIG. 3, various properties of a visualization may be shared between the respective AR devices and used to adjust the visualization. These properties may include, for example, information indicating the sampling rates of various sensors, or other information pertaining to the operation of a sensor, to help synchronize the collection and display of information by the respective devices. An example of this includes altering the zoom level of a device's camera, in order to use the same zoom level employed by another device. Another example includes camera and display transforms, which may be used to allow graphical information provided by one device to be displayed by another.

At 1306, the augmented reality device identifies perspective differences between the devices. This may comprise identifying factors that might, absent the techniques described herein, interfere with synchronizing the display of the shared visualization.

In an embodiment, a factor that may interfere with synchronization is the placement of objects that occlude the visualized object. As depicted in FIG. 4, the placement of objects in each device's field of view may vary due to perspective differences. For example, the visualization of the AR object might be occluded in one field of view, but not the other.

In an embodiment, a factor that may interfere with synchronization is differing zoom levels between the respective devices. For example, one device might be zoomed in on a particular feature of the AR object, while the other is zoomed out to view the object as a whole.

In an embodiment, a factor that may interfere with synchronization is a different angle of view. For example, one device might be viewing the object from the front, while the other might be viewing the object from the side or rear.

These and other such differences may make it difficult for the users of the augmented reality devices to share information regarding the visualization. Accordingly, at 1308, the augmented reality device adjusts the visualization based on the properties of the second device's visualization of the object, and to account for perspective differences between the two devices.

In an embodiment, the properties of the second device's visualization are those that are to be synchronized with the first display. The synchronized features may include those that facilitate sharing of useful information about the object. In an embodiment, the visualization includes a display of at least some portion of the object at the same zoom level used on another device. For example, the object might be displayed in its original location at the device's current zoom level, but supplemented by an additional display showing the object at a different magnification level. In an embodiment, the visualization includes a display of a portion of the object that would not otherwise be visible to the user, based on the different viewpoints of the devices. In an embodiment, the visualization includes repositioning of the object, or some other alteration of the display, to minimize or eliminate the effect of occlusion of the visualization by other objects.

Accordingly, embodiments may adjust a shared visualization based on one or more properties used by another device—so that each device displays the visualization in a manner that is synchronized, to varying degrees, with the other devise—and in a manner that accounts for perspective differences, such as minimizing occlusion of other objects in the scene by aspects of the visualization.

In an embodiment, an augmented reality device receives data, collected from another device), which provides a view of an object not viewable from the augmented reality device's current perspective. The augmented reality device adapts the information to local display, and generates an aspect of the visualization that includes the view from the other device's perspective. In some embodiments, the object is rotated in the visualization so that it is observed in the scene from the other device's perspective.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1400 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 14. Thus, the depiction in FIG. 14 should be taken as being illustrative in nature and not limiting to the scope of the disclosure.

The network 1404 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1404 are well known and will not be discussed in detail. Communication over the network 1404 can be enabled by wired or wireless connections and combinations thereof. In an embodiment, the network 1404 includes the Internet and/or other publicly addressable communications network, as the environment 1400 includes one or more web servers 1406 for receiving requests and serving content in response thereto, although for other networks an alternative device serving a similar purpose could be used as would be apparent to one of ordinary skill in the art.

The illustrative environment 1400 includes one or more application servers 1408 and data storage 1410. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts. "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1408 can include any appropriate hardware, software and firmware for integrating with the data storage 1410 as needed to execute aspects of one or more applications for the electronic client device 1402, handling some or all of the data access and business logic for an application. The one or more application servers 1408 may provide access control services in cooperation with the data storage 1410 and is able to generate content including, text, graphics, audio, video, and/or other content usable to be provided to the user, which may be served to the user by the one or more web servers 1406 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1402 may be processed by the electronic client device 1402 to provide the content in one or more forms including forms that are perceptible to the user audibly, visually, and/or through other senses. The handling of all requests and responses, as well as the delivery of content between the electronic client device 1402 and the one or more application servers 1408, can be handled by the one or more web servers 1406 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1410 can include several separate data tables, databases, data documents, dynamic data storage schemes, and/or other data storage mechanisms and media for storing data relating to a particular aspect of the present disclosure. For example, the data storage 1410 may include mechanisms for storing various types of data and user information 1416, which can be used to serve content to the electronic client device 1402. The data storage 1410 also is shown to include a mechanism for storing log data, such as application logs, system logs, access logs, and/or various other event logs, which can be used for reporting, analysis, or other purposes. It should be understood that there can be many other aspects that may need to be stored in the data storage 1410, such as page image information and access rights information, which can be stored in any of the above listed mechanisms as appropriate or in additional mechanisms in the data storage 1410. The data storage 1410 is operable, through logic associated therewith, to receive instructions from the one or more application servers 1408 and obtain, update, or otherwise process data in response thereto. The one or more application servers 1408 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1408.

In one embodiment, a user, through a device operated by the user, can submit a search request for a match to a particular search term. In this embodiment, the data storage 1410 might access the user information to verify the identity of the user and obtain information about items of that type. The information then can be returned to the user, such as in a results listing on a web page that the user is able to view via a browser on the electronic client device 1402. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1404. These devices also can include virtual devices such as virtual machines, hypervisors, and other virtual devices capable of communicating via the network 1404.

Various embodiments of the present disclosure utilize the network 1404 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1404 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1406, the one or more web servers 1406 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1400 can include a variety of data stores and other memory and storage media as discussed above. These can reside in a variety of locations, such as on a storage medium local to (and/or resident in) one or more of the computers or remote from any or all of the computers across the network 1404. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system comprising:
   at least one processor; and
   a memory having stored thereon computer-executable instructions that, when executed by the at least one processor, cause the system to:
   obtain sensor data comprising information indicative of a first object observed in a scene;
   obtain information indicative of an identity of the first object, the information obtained based, at least in part, on the sensor data and a database comprising information indicative of dimensions of a plurality of objects;
   obtain, from the database, a first size based at least in part on the identity of the first object; and
   generate an augmented reality visualization based, at least in part, on a determination of a distance to a second object in the scene, the distance to the second object determined based, at least in part, on the first size.

2. The system of claim 1, wherein the memory has stored thereon computer-executable instructions that, when executed by the at least one processor, cause the system to:
   recognize an environmental code in the sensor data; and
   obtain the identity of the first object, the identity determined based at least in part on the environmental code.

3. The system of claim 1, wherein the first size is determined based at least in part on a size statistics for objects of the same class as the first object.

4. The system of claim 1, wherein the memory has stored thereon computer-executable instructions that, when executed by the at least one processor, cause the system to:
   obtain an estimate of importance of the second object, the estimate based at least in part on the distance to the second object.

5. The system of claim 1, wherein the database comprises information indicative of a range of sizes associated with the first object.

6. The system of claim 1, wherein an identity of the second object is determined based at least in part on scale information derived from the first size.

7. A computer-implemented method, comprising:
   obtaining sensor data comprising information indicative of a first object in a scene;
   determining an identity of the first object based, at least in part, on a database comprising information indicative of sizes of a plurality of objects;
   determining a first size of the first object, the first size based at least in part on the identity of the first object;
   determining, based at least in part on the first size, a distance to a second object in the scene; and
   generating an augmented reality visualization based, at least in part, on the distance to the second object in the scene.

8. The computer-implemented method of claim 7, further comprising:
   determining the first size based at least in part on one or more statistics of sizes of objects sharing an identity with the first object.

9. The computer-implemented method of claim 7, further comprising:
   determining, based at least in part on the distance to the second object, an estimate of importance of the second object.

10. The computer-implemented method of claim 7, further comprising:
    determining an identity of the first object based at least in part on an environmental code recognized in the sensor data.

11. The computer-implemented method of claim 10, wherein the environmental code is affixed to the first object.

12. The computer-implemented method of claim 7, further comprising:
    determining a scale of objects depicted in the scene, based at least in part on the first size.

13. The computer-implemented method of claim 7, wherein the database comprises information indicative of sizes of objects falling within a class of objects.

14. The computer-implemented method of claim 7, further comprising determining an identity of the second object, based at least in part on the second size.

15. A non-transitory computer-readable storage medium having stored thereon executable instructions that, in response to being executed by one or more processors of an augmented reality device, cause the augmented reality device to at least:
    obtain sensor data comprising information indicative of a first object in a scene;
    obtain information indicative of an identity of the first object based, at least in part, on a database comprising information indicative of sizes of a plurality of objects;
    obtain a first size based at least in part on the identity of the first object;
    obtain a distance to a second object in a scene, the distance determined based at least in part on the first size; and
    generate an augmented reality visualization of the second object, based at least in part on a distance to the second object.

16. The non-transitory computer-readable storage medium of claim 15, wherein the first size is determined based at least in part on one or more statistics of sizes of objects sharing an identity with the first object.

17. The non-transitory computer-readable storage medium of claim 15, wherein an estimate of importance of the second object is determined based at least in part on the second size.

18. The non-transitory computer-readable storage medium of claim 15, wherein the identity of the first object is determined based at least in part on an environmental code recognized in the sensor data.

19. The non-transitory computer-readable storage medium of claim 15, wherein the first size is determined based, at least in part, on a category of objects in which the first object belongs.

20. The non-transitory computer-readable storage medium of claim 15, wherein the first object comprises an environmental code.

* * * * *